UNITED STATES PATENT OFFICE.

PAUL W. PETERSEN, OF CHICAGO, ILLINOIS.

METHOD OF PRESERVING COMESTIBLES.

1,388,298.      Specification of Letters Patent.      Patented Aug. 23, 1921.

Application filed June 4, 1921. Serial No. 475,042.

*To all whom it may concern:*

Be it known that I, PAUL W. PETERSEN, a citizen of the United States, residing at Chicago, in the county of Cook and State of Illinois, have invented new and useful Improvements in Methods for Preserving Comestibles, of which the following is a full, clear, concise, and exact description, reference being had to the accompanying drawing, forming a part of this specification.

My invention relates to methods for preserving comestibles and it has special reference to the preservation of comestibles by means of subjecting them to a refrigerating action by immersing the comestibles in a brine solution and subsequently glazing them to provide a permanent ice coating for them.

More particularly my invention relates to an improved method for preserving comestibles, especially fish, which are first refrigerated in a brine solution and then treated so that a thick, clear, uniform and permanent ice coating or glazing may be formed upon the comestibles so that they will retain during storage substantially their initial properties and, at the same time, have the appearance of being fresh.

Heretofore comestibles refrigerated in a brine solution, wherein they are either chilled or frozen, could not be satisfactorily glazed on being removed from the brine solution because the ice coating formed upon such comestibles would be mushy, non-uniform and very thin. This glaze was not sufficiently permanent or satisfactory for products which were to be stored.

In order to glaze articles refrigerated in a brine solution satisfactorily so that the glaze imparted thereto may be thick, clear, uniform and sufficiently permanent, such as the glaze imparted to products that have been refrigerated in air, I have invented the process herein described, and for a better understanding of the nature of my invention reference may be had to the following description of my present invention.

It is highly desirable to refrigerate comestibles, particularly fish, by immersing the fish in a cold brine solution which serves as a bath. But comestibles may be treated by brine solutions other than by immersing them in a brine bath. After the fish have been retained in this brine solution or treated by brine for a suitable period of time, I remove them and quickly subject them to a fresh water bath which may be applied to them either by spraying or by immersing them and, preferably, in running water. In this manner the solute or solutes comprised in the brine refrigerating bath or brine treating solution and which may be deposited on the fish or held in suspension in the thin film of the brine clinging to the fish when it is withdrawn from the brine treating operation may be diffused. Again, by washing them in this fresh water bath the solute or solutes comprised in the refrigerating bath or treating solution may be carried off so as to preclude any subsequent contamination of the fish. It is highly desirable that the temperature of this fresh water bath be of such degree as to accelerate the diffusion of the solute or solutes that may be deposited on the fish. It is, of course, necessary that this fresh water bath be, at the same time, of such a temperature as not to substantially affect the inherent cold absorbed by the fish in the refrigerating brine solution. Comestibles refrigerated in a strong brine solution of comparatively low temperature may be subjected to a fresh water bath of a higher temperature than comestibles refrigerated in a weak brine solution of comparatively high temperature. I have found that it is preferable to apply the fresh water bath to the comestibles in a room of a temperature at or below 32° Fahrenheit.

After washing the comestible or fish, or the articles being treated, in the fresh water bath, as indicated above, I then subject the comestibles to the action of an air freezer where they should remain for a sufficiently long time to dry and harden them by evaporation and simultaneously bring their surface covering of ice, which has been slightly melted by the previous bath, quickly back to a low enough temperature to facilitate the taking of the desired thickness of glaze when the comestibles are subsequently immersed in a cold water bath. The temperature of the air freezer should be as low as is practical and the time during which the comestibles should remain therein may vary from a few minutes to several hours depending upon the temperature maintained in the freezer, the quantity, the nature of packing and the surface conditions of the comestibles treated, as well as upon the desired thickness of the subsequent glaze. In some instances, in lieu of placing the comestibles in a separate and distinct air freezer, the comestibles may be detained for some time in the same room in which they were subjected to the fresh water bath. In such cases the room in which the fresh water bath is carried on or the glazing room may serve the same purpose as a separate and distinct air freezer room.

After the comestibles have been removed from the air freezer, or the equivalent thereof, the products are then immersed for a few moments in a cold water bath, at a temperature of preferably 32° Fahrenheit, whereby the glazing coating is put on. It is desirable to regulate the time that the comestibles are retained in the glazing bath. The greater the inherent cold in the comestible the longer it may be immersed in the glazing bath but a too long immersion in the glazing bath may soften the surface of the comestibles.

The room in which the glazing is done should be closely adjacent to the air freezer room and at a temperature below 32° Fahrenheit. If it is desired to impart more than one coating of glazing on the comestibles the products are either returned to the air freezer for a few minutes and then reglazed by renewed immersion, or the products may be retained in the glazing room wherein they are suspended for a time so as to come in contact with the cold air and then subjected to a reglazing operation.

After the comestibles have been refrigerated and glazed, as indicated above, they may be placed in storage. It is, of course, usual to subject comestibles to reglazing if they are maintained in a freezing storage room for a substantially long time and the products treated in accordance with my present method may be likewise reglazed without deterioration.

While the foregoing method which I have invented is described as comprising four distinct steps; namely, refrigerating, then washing, then subjecting them to the action of cold air and then dipping them for actual glazing, it is quite apparent that these steps may not be entirely separate and distinct since the placing of the comestibles in a sharp air freezer may, under certain conditions, be dispensed with by suspending the comestibles in the air of the washing room. It is, therefore, to be understood that the four distinct steps referred to need not necessarily be carried out as described above.

It is also to be understood that my method may be applied successfully to products that are either chilled or frozen in a brine refrigerating bath, or by the brine treatment, and whether the products are in bulk, contained in baskets or other suitable holders, in molds, or in their final shipping cases. If the comestibles are to be refrigerated in any way other than in their actual shipping cases they may be transferred to the final shipping cases at almost any step in my process. If the products are frozen, as in pans or molds, the cakes may be removed from the pans or molds during the washing of the comestibles. In this fashion the cakes when subjected to the air freezer will become further strengthened and thereby be more satisfactory to handle.

I do not desire to have it understood that I am insistent upon the use of any particular apparatus in carrying out my process or that my process is specific to any particular method of packing the comestibles since any of these steps may be carried on very satisfactorily in a number of ways.

While I have herein described my invention in detail it is to be understood that I desire only such limitations placed thereupon as are set forth in the appended claims.

Having thus described my invention what I now claim as new and desire to secure by Letters Patent is:

1. The method of preserving a comestible which comprises refrigerating the comestible by treating with a solution containing a solute, then subjecting the comestible to a water bath to substantially diffuse and wash away any solute that may be deposited on the comestible, then subjecting the comestible to the action of a sharp freezer, and then immersing the comestible for a short period of time in an ice water bath thereby glazing the comestible.

2. The process of preserving a comestible which comprises treating the comestible in a refrigerating solution containing a solute, then substantially removing the solute from the comestible, then subjecting the comestible to the action of cold air, and then glazing the comestible by immersing it in ice water.

3. The process of preserving a comestible which comprises refrigerating the comestible with a brine solution to the point where the brine solution may subsequently be washed off by cold water without the comestible being substantially deprived of its inherent cold, then washing the comestible with cold water, then subjecting the comestible to the action of cold air, then glazing the comestible by immersing it in an ice water bath, and then storing the comestible in air maintained below the freezing point.

4. The process of preserving a comestible which comprises treating the comestible with a brine solution, then substantially removing the brine solution from the comestible, then subjecting the comestible to the action of cold air, and then glazing the comestible by immersing it in an ice water bath.

5. The process of preserving a comestible which consists in partly freezing the comestible with a brine solution, then washing the comestible, then glazing it, and then storing it in cold air.

6. The process of glazing a comestible which has been refrigerated by treating with a brine solution which consists in first washing off the brine from the refrigerated comestible and then immersing the comestible in ice water.

7. The process of preserving a comestible which consists in refrigerating the comestible by direct contact with a brine solution, then washing off the refrigerated comestible with plain water, then glazing the comestible, and then freezing the comestible in cold air.

In witness whereof, I have hereunto subscribed my name.

PAUL W. PETERSEN.

Witnesses:
GEO. W. HANSEN,
LAURA M. SCHNEIDER.